US 11,956,748 B2

(12) United States Patent
Hathiramani et al.

(10) Patent No.: US 11,956,748 B2
(45) Date of Patent: Apr. 9, 2024

(54) PRIVATE NETWORK TRACKING AREA COLLISION AVOIDANCE

(71) Applicant: Nokia Technologies Oy, Espoo (FI)

(72) Inventors: Navin Hathiramani, Coppell, TX (US); Devaki Chandramouli, Plano, TX (US)

(73) Assignee: Nokia Technologies Oy, Espoo (FI)

(*) Notice: Subject to any disclaimer, the term of this patent is extended or adjusted under 35 U.S.C. 154(b) by 204 days.

(21) Appl. No.: 17/456,932

(22) Filed: Nov. 30, 2021

(65) Prior Publication Data

US 2022/0174640 A1  Jun. 2, 2022

Related U.S. Application Data

(60) Provisional application No. 63/119,172, filed on Nov. 30, 2020.

(51) Int. Cl.
*H04W 60/04* (2009.01)
*H04W 36/00* (2009.01)
*H04W 36/08* (2009.01)
*H04W 36/30* (2009.01)

(52) U.S. Cl.
CPC ..... *H04W 60/04* (2013.01); *H04W 36/00835* (2018.08); *H04W 36/08* (2013.01); *H04W 36/305* (2018.08)

(58) Field of Classification Search
None
See application file for complete search history.

(56) References Cited

U.S. PATENT DOCUMENTS

2013/0281090 A1* 10/2013 Maeda ............... H04W 48/16
455/434
2014/0295837 A1 10/2014 Madasamy .......... 455/435.1
(Continued)

FOREIGN PATENT DOCUMENTS

| WO | WO-2009/099162 A1 | 8/2009 |
| WO | WO 2010/091430 A1 | 8/2010 |
| WO | WO-2020/028600 A1 | 2/2020 |

OTHER PUBLICATIONS

"[Draft] LS on False Base Station Detection", SAS, 3GPP TSG-SA3 Meeting #99e, S3-201166, May 2020, 2 pages.
(Continued)

*Primary Examiner* — Kenny S Lin
(74) *Attorney, Agent, or Firm* — Barta Jones, PLLC

(57) ABSTRACT

A determination is made that a registration attempt by a UE with a cell of a wireless network has failed when the UE is in a current tracking area. The UE updates a first list with indications(s) corresponding to the cell and an indication of the current tracking area, and the UE uses the first list for additional registration attempts. A network node sends, toward the UE, a request for the UE to store information, the storing to be in response to registration attempts by the UE with cells of the wireless network having failed while in corresponding tracking areas. The information is to include indication(s) corresponding to the cells and corresponding indication(s) of the tracking areas for the cells. The network node receives, in response to a successful secure connection having been performed between the wireless network and the UE, the information from the user equipment.

11 Claims, 6 Drawing Sheets

(56) References Cited

U.S. PATENT DOCUMENTS

| | | | | |
|---|---|---|---|---|
| 2014/0348064 | A1* | 11/2014 | Jeong | H04W 36/0022 |
| | | | | 370/328 |
| 2015/0126189 | A1* | 5/2015 | Rao | H04W 4/08 |
| | | | | 455/435.2 |
| 2016/0057661 | A1* | 2/2016 | Nayak | H04W 4/50 |
| | | | | 370/331 |
| 2016/0373977 | A1* | 12/2016 | Sripada | H04W 36/04 |
| 2018/0007729 | A1* | 1/2018 | Koshta | H04L 41/0672 |
| 2019/0223246 | A1* | 7/2019 | Huang-Fu | H04W 76/18 |
| 2021/0105308 | A1* | 4/2021 | Bouazizi | H04L 65/1073 |
| 2021/0185589 | A1* | 6/2021 | Telang | H04W 48/02 |
| 2022/0322182 | A1* | 10/2022 | Lee | H04B 7/0617 |

OTHER PUBLICATIONS

"3$^{rd}$ Generation partnership Project; Technical Specification Group Services and System Aspects Study on 5G Security Enhancement against False Base Stations (Release 16)", 3GPP TR 33.809 V0.9.0, May 2020, 76 pages.

"3rd Generation Partnership Project; Technical Specification Group Services and System Aspects; System architecture for the 5G System (5GS); Stage 2 (Release 16), 3GPP TS 23.501 V16.6.0", Sep. 2020, 447 pages.

"3rd Generation Partnership Project; Technical Specification Group Core Network and Terminals' Non-Access-Stratum (NAS) protocol for Evolved Packet System (EPS); Stage 3 (Release 17), 3GPP TS 24.301 V17.0.0", Sep. 2020, 585 pages.

"CBRS Alliance Identifier Administration Guidelines for Shared HNI, CBRSA-TR-0101, V1.0.0", Jan. 21, 2019, 12 pages.

"Rd Generation Partnership Project; Technical Specification Group Radio Access Network; Evolved Universal Terrestrial Radio Access (E-UTRA); Radio Resource Control (RRC); Protocol specification (Release 16), 3GPP TS 36.331 V 16.6.0", Sep. 2021, 1091 pages.

"3rd Generation Partnership Project; Technical Specification Group Core Network and Terminals; Non-Access-Stratum (NAS) functions related to Mobile Station (MS) in idle mode (Release 17), 3GPP TS 23.122 V17.4.0", Sep. 2021, 107 pages.

"3rd Generation Partnership Project; Technical Specification Group Ratio Access Network; Evolved Universal Terrestrial Radio Access (E-UTRA); Base Station (BS) radio transmission and reception (Release 17), 3GPP TS 36.104 V17.3.0", Sep. 2021, 293 pages.

"CBRS Network Services Use Cases and Requirements, CBRSA-TS-1001 V3.0.0", Feb. 18, 2020, 49 pages.

"CBRS Network Services Stage 2 and 3 Specification, CBRSA-TS-1002 V3.0.0", Feb. 18, 2020, 55 pages.

"3rd Generation Partnership Project; Technical Specification Group Radio Access Network; Evolved Universal Terrestrial Radio Access (E-UTRA); User Equipment (UE) procedures in idle mode (Release 16), 3GPP TS 36.304 V16.5.0", Sep. 2021, 64 pages.

"3rd Generation Partnershp Project; Technical Specification Group Services and System Aspects; General Packet Radio Services (GPRS) enhancements for Evolved Universal Terrestrial Radio Access Network (E-UTRAN) access (Release 27), 3GPP TS 23.401 V17.2.0", Sep. 2021, 448 pages.

"Use of tracking area- and cell identify for private networks/home cells", Samsung, 3GPP TSG-RAN WG2 Meeting #57bis., R2-071349, Mar. 2007, 3 pgs.

"Lists of forbidden TAIs in an SNPN", Nokia, Nokia Shanghai Bell, 3GPP TSG-CT WG1 Meeting #119, C1-194783, Aug. 2019, 2 pgs.

"(TP for NPN BL CR for TS 38.413): Mobility restriction list", Huawai, 3GPP TSG-RAN3 Meeting #106, R3-197592, Nov. 2019, 5 pgs.

* cited by examiner

| IDENTIFIER | ASSIGNED BY... | | | | IDENTIFIES | QUANTITY |
|---|---|---|---|---|---|---|
| | IMSI ADMIN | CBRS-A | CBRS OPERATOR | | | |
| IMSI | MCC+MNC (SHNI)+IBN | — | UIN | | SUBSCRIPTION | 10,000 IBN x 100,000 UIN per SHNI |
| CBRS-NID | — | CBRS-NID | | | NETWORK | $2^{27}$ per SHNI[1] |
| GUMMEI | SHNI | MMEGI | MMEC | | MME | $2^{16}$ MMEGI x $2^8$ MMEC per SHNI |
| ECGI | SHNI | MACRO eNB ID | CELL IDENTITY | | CELL OR SECTOR (eNodeB) | $2^{20}$ MACRO eNB ID x $2^8$ CELL IDENTITY per SHNI |
| TAI/TAC | SHNI | — | TAC | | TRACKING AREA | 65534 per REGION OF OVERLAP |

TABLE 1: CBRS IDENTIFIERS

FIG. 2

US 11,956,748 B2

PRIVATE NETWORK TRACKING AREA COLLISION AVOIDANCE

TECHNICAL FIELD

Exemplary embodiments herein relate generally to wireless communications and, more specifically, relates to accessing private networks, such as private long-term evolution (pLTE) networks.

BACKGROUND

A private network, such as a long-term evolution (LTE) network, is typically based on normal network LTE network from architecture and functionality points of view. Private LTE networks are networks which enable non-mobile network operators (non-MNOs) and non-multiple system operators (non-MSOs) to deploy LTE networks. These can be deployed, for example, by entities such as a store in a mall or a mining company. These networks are isolated networks, thus not always available for access to the public, unlike normal LTE networks.

One challenge with third generation partnership project (3GPP) networks, e.g., cellular network systems, concerns the identifiers. One of the key identifiers used by user equipment (UEs) for network selection is the public land mobile network identification (PLMN ID). It would not make sense or likely be possible to assign a unique PLMN ID for every private LTE operator, hence a shared PLMN ID is available in the citizen broadband radio service (CBRS) alliance for these operators. This shared PLMN ID is also referred to as the shared home network identifier (SHNI). When the SHNI is employed, other network IDs have to be administered to avoid UEs camping on or selecting the incorrect network.

In further detail, private networks may not always be able to able to obtain unique PLMN IDs from regulators, as regulators require the networks to offer services to public in order to assign unique PLMN ID and IMSIs (international mobile subscriber identities) for their subscribers. Thus, private network operators are not able to obtain their own.

As a result, the CBRS alliance obtained shared PLMN IDs for pLTE networks deployed in the CBRS or other bands. For deployments in the CBRS band, the SHNI is managed by CBRS alliance, and they also manage identifiers such as closed subscriber group (CSG) ID, E-UTRAN Global Cell Identifier (ECGI), and the like in order to uniquely differentiate the network. However, they do not manage the tacking area codes (TACs) to be unique.

As an introduction to TACs, while a UE (user equipment) is in an idle state, its location is known by a network, such as a long-term evolution (LTE) network, at a tracking area (TA) level instead of a cell level. That is, an operator defines a group of neighbor eNBs (evolved NodeB, e.g., a base station that provides access to the wireless network) as a TA. A TA can be made up of cells or eNBs. The TA is used to route data to the UE. For example, if there is data traffic heading to a UE in the idle state (e.g., if someone sends a text message to the UE), the LTE network has to page the UE so that the UE can receive the data. In order to do this, the network sends a paging message to every eNB in the TA where the UE was previously known to be. Then each eNB broadcasts the paging message over its corresponding radio link to page the UE. A UE in an idle state wakes up at certain periods to check for a paging message to see if there is any incoming data. If the UE finds it has been paged by an eNB, the UE transitions to an active state to receive the data.

BRIEF SUMMARY

This section is intended to include examples and is not intended to be limiting.

In an exemplary embodiment, a method is disclosed that includes determining a registration attempt by a user equipment with a cell of a wireless network has failed when the user equipment is in a current tracking area. The method includes updating by the user equipment a first list with one or more indications corresponding to the cell and an indication of the current tracking area. The method further includes using by the user equipment the first list for additional registration attempts.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus at least to: determine a registration attempt by a user equipment with a cell of a wireless network has failed when the user equipment is in a current tracking area; update by the user equipment a first list with one or more indications corresponding to the cell and an indication of the current tracking area; and use by the user equipment the first list for additional registration attempts. The apparatus may form at least part of the user equipment.

An exemplary computer program product includes a computer-readable storage medium bearing computer program code embodied therein for use with a computer. The computer program code includes: code for determining a registration attempt by a user equipment with a cell of a wireless network has failed when the user equipment is in a current tracking area; code for updating by the user equipment a first list with one or more indications corresponding to the cell and an indication of the current tracking area; and code for using by the user equipment the first list for additional registration attempts.

In another exemplary embodiment, an apparatus comprises means for performing: determining a registration attempt by a user equipment with a cell of a wireless network has failed when the user equipment is in a current tracking area; updating by the user equipment a first list with one or more indications corresponding to the cell and an indication of the current tracking area; and using by the user equipment the first list for additional registration attempts.

In an exemplary embodiment, a method is disclosed that includes sending, by a network node toward a user equipment, a request for the user equipment to store information. The storing is to be in response to registration attempts by the user equipment with cells of the wireless network having failed while in corresponding tracking areas. The information is to include one or more indications corresponding to the cells and include corresponding indications of the tracking areas for the cells. The method includes receiving, in response to a successful secure connection having been performed between the wireless network and the user equipment, the information at the network node and from the user equipment.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus at least to: send, by a network node toward a user equipment, a request for the user equipment to store information, the storing to be in response to registration attempts by the user equipment with cells of the wireless network having failed while in corresponding tracking areas, wherein the information is to include one or more indications corresponding to the cells and include corresponding indications of the tracking areas for the cells; and receive, in response to a successful secure connection having been performed between the wireless network and the user equipment, the information at the network node and from the user equipment. The apparatus may form at least part of the network node.

An exemplary computer program product includes a computer-readable storage medium bearing computer program code embodied therein for use with a computer. The computer program code includes: code for sending, by a network node toward a user equipment, a request for the user equipment to store information, the storing to be in response to registration attempts by the user equipment with cells of the wireless network having failed while in corresponding tracking areas, wherein the information is to include one or more indications corresponding to the cells and include corresponding indications of the tracking areas for the cells; and code for receiving, in response to a successful secure connection having been performed between the wireless network and the user equipment, the information at the network node and from the user equipment.

In another exemplary embodiment, an apparatus comprises means for performing: sending, by a network node toward a user equipment, a request for the user equipment to store information, the storing to be in response to registration attempts by the user equipment with cells of the wireless network having failed while in corresponding tracking areas, wherein the information is to include one or more indications corresponding to the cells and include corresponding indications of the tracking areas for the cells; and receiving, in response to a successful secure connection having been performed between the wireless network and the user equipment, the information at the network node and from the user equipment.

BRIEF DESCRIPTION OF THE DRAWINGS

In the attached Drawing Figures:

FIG. 2 is a table (Table 1) of CBRS identifiers from CBRSA TR-0101;

DETAILED DESCRIPTION OF THE DRAWINGS

Figure 1:
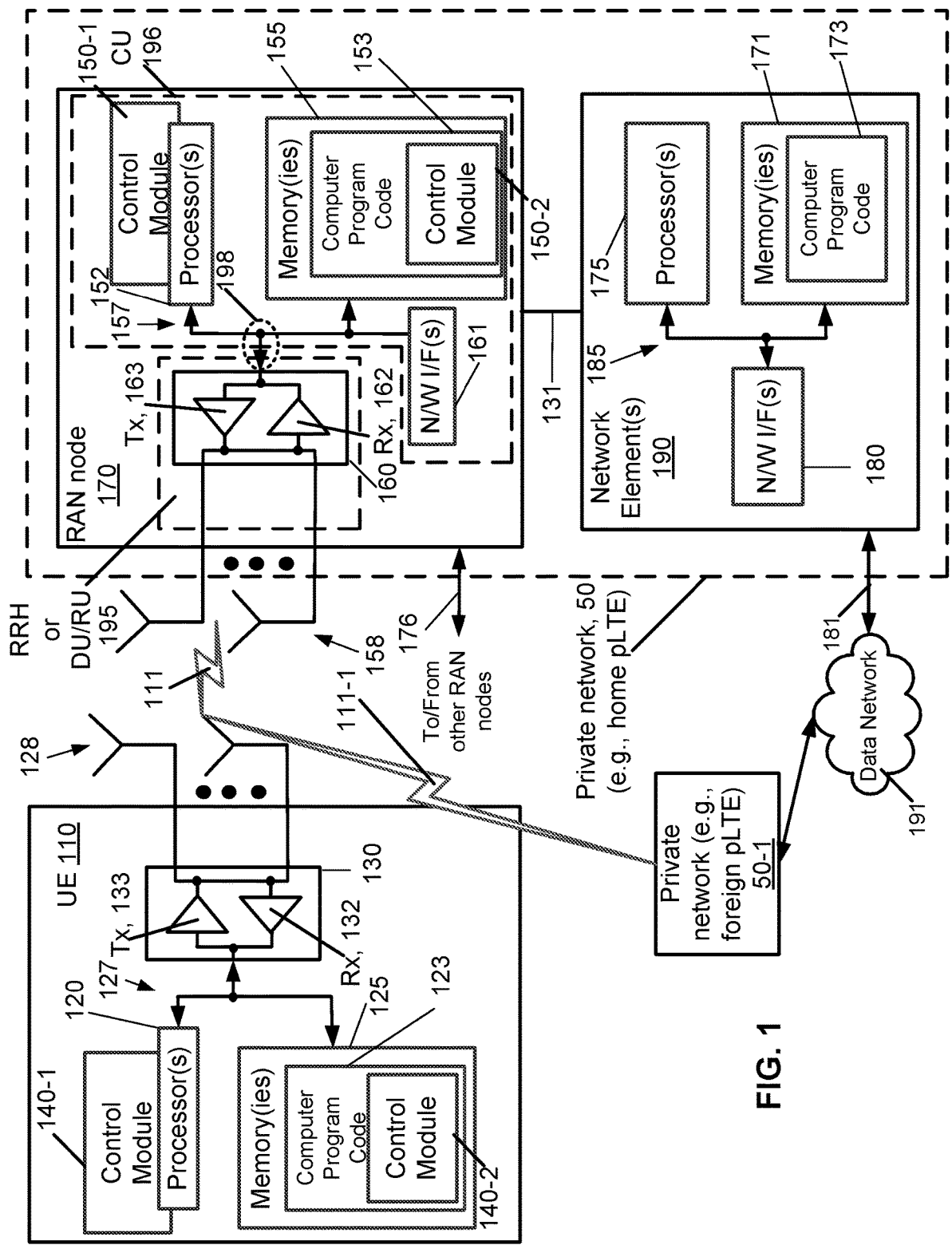
FIG. 1 is a block diagram of one possible and non-limiting exemplary system in which the exemplary embodiments may be practiced.

Abbreviations that may be found in the specification and/or the drawing figures are defined below, at the end of the detailed description section.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention.

The exemplary embodiments herein describe techniques for private network tracking area collision avoidance. Additional description of these techniques is presented after a system into which the exemplary embodiments may be used is described.

Turning to FIG. 1, this figure shows a block diagram of one possible and non-limiting exemplary system in which the exemplary embodiments may be practiced. A user equipment (UE) 110, radio access network (RAN) node 170, and network element(s) 190 are illustrated. Further, two private networks 50 and 50-1 are illustrated and described below. In FIG. 1, a user equipment (UE) 110 is in wireless communication via a wireless link 111 with a private network 50, which may be a home pLTE network. The UE 110 may also be in wireless communication via a wireless link 111-1 with a private network 50-1, which may be a foreign pLTE network. Although pLTE networks are referred to mainly herein, the private networks 50, 50-1 may be other private networks, such as 5G networks.

The UE 110 is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a control module 140, comprising one of or both parts 140-1 and/or 140-2, which may be implemented in a number of ways. The control module 140 may be implemented in hardware as control module 140-1, such as being implemented as part of the one or more processors 120. The control module 140-1 may be implemented also as an integrated circuit or through other hardware such as a programmable gate array. In another example, the control module 140 may be implemented as control module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111 (or via another RAN node 170 via a wireless link 111-1).

Exemplary internal configuration of the private network 50 is described herein. The private network 50-1 is assumed to be similar to private network 50, and thus is not described here. The private network 50 comprises the RAN node 170 and the network elements(s) 190. In the examples below, the means and functionality that cause the operations described herein are in the control module 150, which is assumed to be in the RAN node 170. However, this functionality may be in other nodes, such as one of the network elements 190. Furthermore, the control module 150 might be divided into parts over multiple entities, such as the RAN node 170 and one or more of the network elements 190.

The RAN node 170 is a base station that provides access by wireless devices such as the UE 110 to the private network 50. The RAN node 170 will be primarily referred to herein as an eNB, as the examples involve LTE, but this is only one example. The RAN node 170 may be, for instance, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface to a 5GC (e.g., the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by one gNB-DU. The gNB-DU terminates the F1 interface 198 connected with the gNB-CU. Note that the DU 195 is considered to include the transceiver 160, e.g., as part of an RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a control module 150, comprising one of or both parts 150-1 and/or 150-2, which may be implemented in a number of ways. The control module 150 may be implemented in hardware as control module 150-1, such as being implemented as part of the one or more processors 152. The control module 150-1 may be implemented also as an integrated circuit or through other hardware such as a programmable gate array. In another example, the control module 150 may be implemented as control module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the control module 150 may be distributed, such as being distributed between the DU 195 and the CU 196, or be implemented solely in the DU 195.

The one or more network interfaces 161 communicate over a network such as via the links 176 and 131. Two or more RAN nodes 170 communicate using, e.g., link 176. The link 176 may be wired or wireless or both and may implement, e.g., an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, e.g., fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that the base station that forms the cell will perform the functions. The cell makes up part of a base station. That is, there can be multiple cells per base station. For instance, there could be three cells for a single carrier frequency and associated bandwidth, each cell covering one-third of a 360-degree area so that the single base station's coverage area covers an approximate oval or circle. Furthermore, each cell can correspond to a single carrier and a base station may use multiple carriers. So, if there are three 120-degree cells per carrier and two carriers, then the base station has a total of 6 cells.

The private network 50 may include a network element or elements 190 that may include core network functionality, and which provides connectivity via a link or links 181 with a data network 191, such as a telephone network and/or a data communications network (e.g., the Internet). Such core network functionality for 5G may include access and mobility management function(s) (AMF(s)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the network element(s) 190, and note that both 5G and LTE functions might be supported. The RAN node 170 is coupled via a link 131 to a network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The private network 50 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor-based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general-purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, vehicles with a modem device for wireless V2X (vehicle-to-everything) communication, image capture devices such as digital cameras having wireless communication capabilities, gaming devices having wireless communication capabilities, music storage and playback appliances having wireless communication capabilities, Internet appliances (including Internet of Things, IoT, devices) permitting wireless Internet access and possibly browsing, IoT devices with sensors and/or actuators for automation applications with wireless communication tablets with wireless communication capabilities, as well as portable units or terminals that incorporate combinations of such functions.

Having thus introduced one suitable but non-limiting technical context for the practice of the exemplary embodiments, the exemplary embodiments will now be described with greater specificity.

Shared bands, such as the CBRS band, enable the deployment of new vertical and private networks. LTE Private network deployments are not fully supported by 3GPP specifications. Issues such as the usage of common PLMN identifier (e.g., a Shared Home Network Identifier (SHNI)) by many private network operators and deployments can lead to network and cell selection issues. Note that PLMN selection, cell selection and re-selection and registration update procedures are performed in RRC idle mode. Cell selection implies the UE searches for a suitable cell (as per 3GPP TS 36.304 definition) of the selected PLMN. Cell re-selection is applied if the UE finds a more suitable cell according to established cell re-selection criteria. Once a cell is (re-)selected, a UE can attach to the network using known techniques, and may also perform functions such as tracking area updates, when the tracking area for the UE is updated.

One definition of attaching to the network is the UE establishes an EMM (EPS Mobility Management) context with the MME to, for example, activate a default EPS bearer which provides the UE PDN (Packet Data Network) connectivity. The definitions of certain terms herein can be found in 3GPP TS 36.304 for PLMN selection, cell selection, re-selection, and suitable cell and in 3GPP TS 23.401 for Attach, TAU and registration procedures in general.

The CBRS Alliance (CBRSA) attempts to address these issues to enable private LTE deployments in the CBRS band. Currently, the CBRSA provides an SHNI for private network deployments and additionally assigns some of the other identifiers required for deployments such as IMSI ranges and cell identifier ranges. CBRSA does not manage the Tracking Area Codes (TACs) and hence collision of TAC between different deployments may occur. These factors lead to several problems.

As a first problem, two operators deploying a private network could employ the SHNI and use the same TAC. In this scenario, a UE attempting to attach to the incorrect network would be rejected with cause code #15 as per CBRSA TS-1002 specifications. The rejection with cause code #15 would imply the UE has to include the rejected TAC in a list of forbidden TAs. The rejected TA would stay in this list for a period between 12 to 24 hours to prevent the UE from draining its battery life, however in this specific scenario, it would also prevent the UE from attaching to its network which uses the same TAC. As a result, a UE could be blocked from attaching to its network for up to 24 hours. This issue is highly cumbersome to identify in the field, since networks to which the UE attempted to register are unknown.

One possible solution to this problem is the usage of a CSG. Although CSG is fully supported from a standards point of view, there has been no ecosystem (e.g., UE chipset) adoption of this feature.

A second problem is the following. There is no way for the private network to identify the collision of its allocated TAC with that of another private LTE (pLTE) deployment. Additionally, there could be a denial of service attack, where a fake eNB is placed outside a pLTE network causing all UEs to attempt registration via the fake eNB. Once UEs are rejected by the fake eNB, the UEs will not attempt registration within its pLTE for 12 to 24 hours.

Additional detail is contained in this section from 3GPP TS 24.301:

5.3.2 Lists of forbidden tracking areas

The UE shall store a list of "forbidden tracking areas for roaming", as well as a list of "forbidden tracking areas for regional provision of service". These lists shall be erased when the UE is switched off or when the UICC containing the USIM is removed, and periodically (with a period in the range 12 to 24 hours). One or more tracking areas is removed from the list of "forbidden tracking areas for roaming" in the UE, as well as the list of "forbidden tracking areas for regional provision of service" if, after a subsequent procedure e.g., attach procedure, tracking area updating procedure and GUTI reallocation procedure, one or more tracking areas in the lists is received from the network. If the UE has only one PDN connection established which is for emergency bearer services, the tracking areas shall not be removed from these lists if one or more tracking areas in the lists are received from the network. In S1 mode, the UE shall update the suitable list whenever an ATTACH REJECT, TRACKING AREA UPDATE REJECT, SERVICE REJECT or DETACH REQUEST message is received with the EMM cause #12 "tracking area not allowed", #13 "roaming not allowed in this tracking area", or #15 "no suitable cells in tracking area". Each list shall accommodate 40 or more TAIs. When the list is full and a new entry has to be inserted, the oldest entry shall be deleted.

CBRSA TR-0101 describes the LTE Identifiers and which are managed by CBRSA, as shown below in Table 1 (see FIG. 2). Sections 5.5 and 5.6 of this TR are also included below for reference.

5.5. Macro eNB ID (part of ECGI)

The Macro eNB ID within the ECGI identifies a group of cells within an SHNI. This will be assigned by the CBRS Alliance and will leave 8 bits to be assigned by the operator to identify individual cells. The full ECGI format is SHNI (6d/24b)+Macro eNB ID (5h/20b)+Cell Identity (2h/8b).

5.6. TAC—Tracking Area Code (part of TAI)

The Tracking Area Code is assigned by the operator, not by the CBRS Alliance, and should be locally unique (i.e. not used by any other nearby network broadcasting an SHNI)

According to specification, attach and TAUs (tracking area updates) are the two main registration procedures in LTE. In fact, a UE should not attempt service request in a forbidden TAC either.

Possibilities discussed in the past within CBRSA to address the problems above include the following.

1) CBRSA to handle the allocation of TAC: Managing TAC would mean dynamically updating TAC codes used in different deployments and possibly based on their coverage areas. This was seen as cumbersome, complex to get the TAC data and out of the scope of the alliance's charter and hence this is not a possibility moving forward.

2) Reducing the number of allowed private network deployments using a single SHNI to decrease the probability of TAC collision. Obtaining additional SHNI is not an easy process and hence this was not deemed as the correct solution.

3) 3GPP allows for blacklisting intra-frequency neighbor cells for idle mode mobility via SIB4, however the blacklist is based on PCIs. Partitioning PCI space between different CBRS operators employing the SHNI could lead to challenges for network planning and potential performance issues.

The exemplary embodiments herein address these and other issues. First, an overview is provided, and then additional details are provided.

An exemplary embodiment proposes to add a criterion via which a UE could choose to attempt an ATTACH or TRACKING AREA UPDATE procedure for a tracking area which is in the forbidden TAC list. The forbidden TAC list maintained by the UE could be enhanced, e.g., to include the Home eNB name, if broadcasted in the cell via, e.g., SIB9. This Home eNB Name is employed by CBRSA to provide the CBRS network name. The UE could be allowed to attempt registration in a forbidden TAC, if the cell the UE is camping on has a different CBRS network name from the one included in the forbidden list for the specific TAC under consideration. The CBRS network name can be provisioned in the USIM, and CBRSA can ensure uniqueness of this identifier during requests to use the CBRSA SHNI.

In another alternative, which is also a UE-based solution to the first problem above, since the ECGI range is split per network operator, the UE could be aware of its home network TACs based on its ECGI range(s) to avoid outages from forbidden TACs, as follows.

1) The UE employing SHNI would maintain a list of the allowed TACs for its home network. This list would comprise every TAC the UE successfully registered with while camping on the SHNI and TAI list (TAI=PLMN ID+TAC) provided by the MME during an ATTACH ACCEPT procedure. Along with this list, the UE would maintain a list of the ECGI ranges where the UE has successfully registered or been in RRC connected mode.

2) The UE would additionally maintain a list of forbidden TACs encountered in SHNI networks. In this list, the UE would store the forbidden TACs and the ECGIs of where the registration was rejected.

This way, the UE could avoid camping on SHNI TAC's or ECGIs not deployed by its home network.

Additionally, to address the TAC confusion problem, in exemplary embodiments, the UE 110 could store information on cells where its registration attempt is rejected and this causes the inclusion of the TAC in the forbidden list. The UE could at least store the TAC information, cell ID and location. Upon establishing connection with its network, the UE could relay this information to its serving cell via, e.g., the MDT procedure. This would allow for the eNB 170 to be aware of a TAC collision or a denial of service attack. For TAC collision scenarios, the eNB or its management system could perform a TAC re-planning.

It should be noted that 3GPP UEs operating in the CBRS band are aware of the PLMN value of the SHNI and hence can apply CBRSA specifications based on this.

Now that an overview has been provided, additional details are provided. This is divided into a number of different embodiments, for ease of reference. In particular, three exemplary embodiments are presented, although the instant embodiments are not limited thereto.

In a first embodiment, this concerns scenarios where a registration procedure is rejected, leading to the corresponding TAC to be included in the forbidden TAC list. In this situation and as an example, the UE's NAS layer uses the CBRS network name provided by the UE's AS layer, which the AS layer may receive via broadcast, along with the forbidden TAC to determine whether the TAC is allowed or forbidden for a given cell. The SIB9 message is used to relay the CBRS network name as per CBRSA. Although CSG features are not mandatory as per 3GPP TS 36.331, it is mandatory for UEs to support CSG functionality including the following:

1) Identifying whether a cell is CSG or not; and
2) Ignoring CSG cells in cell selection/reselection.

Identification of whether a cell is CSG or not is provided via, e.g., SIB1 fields of csg-Identity and csg-Indication IEs. Configuring a pLTE network's cells as hybrid CSG cells, i.e., csg-Indication set to false and csg-Identity not absent would mean UEs would decode SIB9 if broadcasted. There are no AS requirements required for CSG idle-mode mobility with this exemplary configuration. This configuration would allow a legacy UE 110, whose USIM has been provisioned with a CBRS network name, to differentiate a TAC of its network versus TAC(s) of other pLTE network(s).

Figure 3:
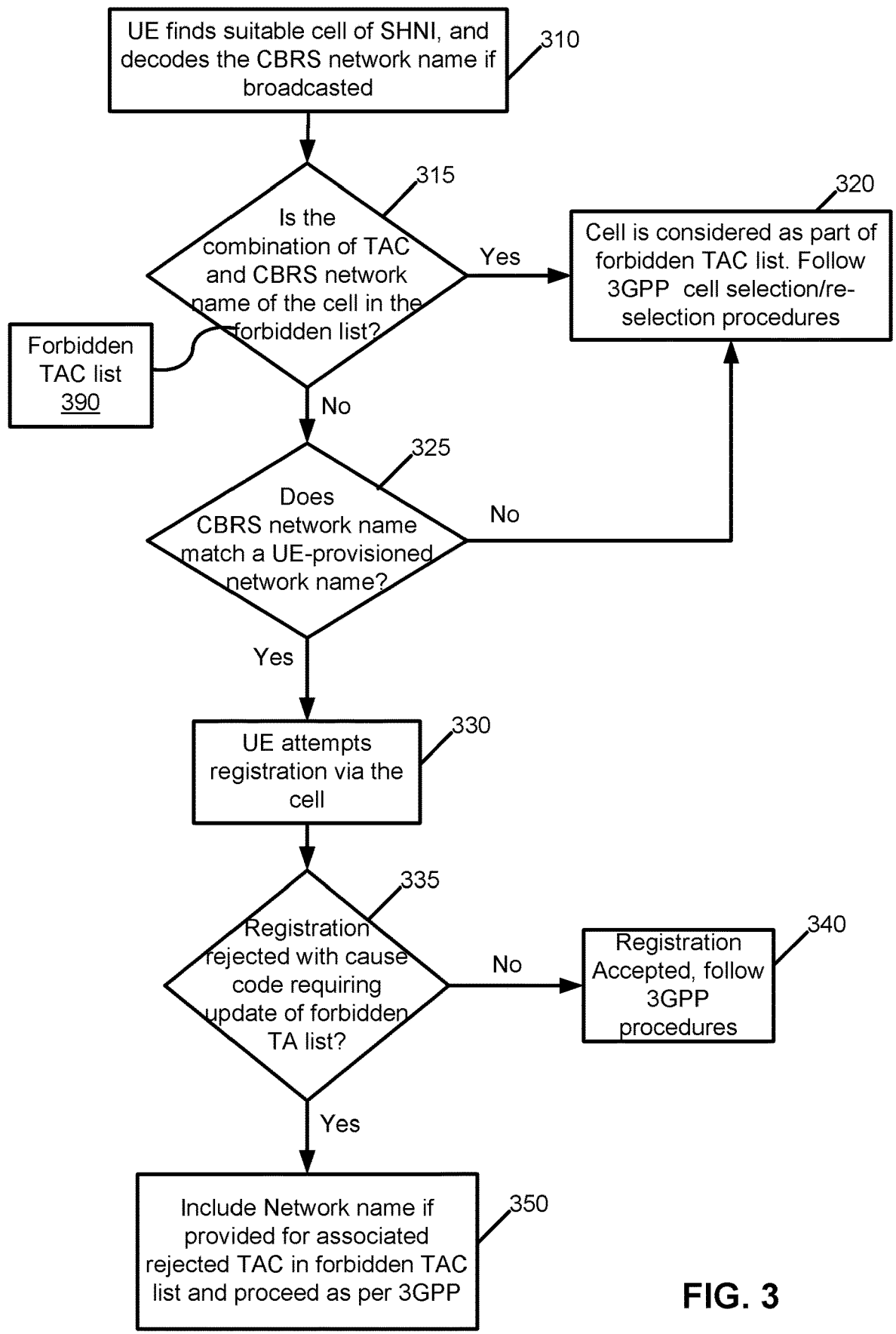
FIG. 3 is a logic flow diagram for UE forbidden TAC list management in an exemplary embodiment.

With the above configuration for a UE belonging to a pLTE network, the management of the forbidden TAC list would then be modified as per FIG. 3. FIG. 3 is a logic flow diagram for UE forbidden TAC list management in an exemplary embodiment. This figure illustrates the operation of an exemplary method or methods, a result of execution of computer program instructions embodied on a computer readable memory, functions performed by logic implemented in hardware, and/or interconnected means for performing functions in accordance with exemplary embodiments. FIG. 3 is performed by a UE 110, e.g., under control of the control module 140, at least in part.

In block 310, the UE finds a suitable cell of SHNI and decodes the CBRS network name if broadcasted. The UE 110 in block 315 determines whether the combination of TAC and CBRS network name of the cell is in the forbidden TAC list 390. If so (block 315=Yes), the cell in block 320 is considered by the UE as being part of the forbidden TAC list 390. The UE 110 follows 3GPP cell selection/reselection procedures. If the combination of TAC and CBRS network name of the cell is not in the forbidden TAC list 390 (block 315=No), the flow proceeds to block 325.

In block 325, the UE 110 determines whether the CBRS network name matches one of the UE-provisioned network names, i.e., CBRS networks for which the UE has a subscription service. If not (block 325=no), the flow proceeds to block 320. If so (block 325=Yes), the flow proceeds to block 330. It is noted in some examples, block 325 might not be used and the flow would instead proceed from block 315 to block 330. The UE 110 in block 330 attempts registration via the cell. In block 335, the UE 110 determines whether the registration is rejected with a cause code requiring an update of the forbidden TAC list 390. If the registration is not rejected (block 335=No), the registration is accepted in block 340 by the UE, and the UE follows 3GPP procedures. If the registration is rejected (block 335=Yes), in block 350, the UE 110 includes the network name if provided for the associated rejected TAC in the forbidden TAC list 390, and proceeds as per 3GPP procedures, e.g., search of another suitable cell (310).

In more detail, during cell selection/re-selection procedures, the UE AS forwards, e.g., to its NAS layer, information on TAC and CBRS network name if provided. The NAS layer can use this provided AS information to determine whether a registration attempt should be performed by UE. The UE 110 attempts registration (block 330) if both the conditions below are fulfilled:

1. The combination of TAC and CBRS network name is not part of forbidden TAC list 390 (block 315); and
2. The CBRS network name provided by the AS layer (received over SIB9) matches the CBRS network name for which the UE is provisioned. See block 325.

With condition number (2), since CBRS network names can be easily mandated to be unique per CBRS operator, all attempts on foreign pLTE networks causing possible denial of service due TAC collision should be eliminated.

If the UE's USIM is provisioned with a CBRS network name, the UE may consider to enhance cell re-selection procedures by considering as suitable cells only those for which condition (1) is fulfilled.

When a UE's registration procedure is rejected with a cause that requires the TAC to be included in the forbidden TAC list maintained at the UE, the UE includes the TAC along with the CBRS network name, if broadcasted by the cell. See block 350. The assumption is that all cells from UEs home pLTE network will broadcast its network name.

In a second embodiment, each CBRS SHNI network operator is entitled to at least 256 ECGIs within a range provided by the CBRSA. The ECGI is composed of the SHNI+Macro eNB ID and Cell Identity. The cell identity is freely assigned by the operator while the Macro eNB ID (e.g., 20 bits) is allocated by the CBRSA.

In this embodiment, the UE 110 would learn the allowed Macro eNB IDs along with allowed TAC codes upon successful registrations. This would minimize registration on forbidden TAC(s) and the corresponding Macro eNB identifier (of an eNB 170) in a given network identified by SHNI. Macro eNB identifier in this context is an eNB identifier. The macro eNB can be a macro eNB, pico eNB, micro eNB or femto eNB, where the terms macro, pico, micro, and femto relate to sizes of the corresponding coverage area (from largest at macro to smallest at femto).

Figure 4:
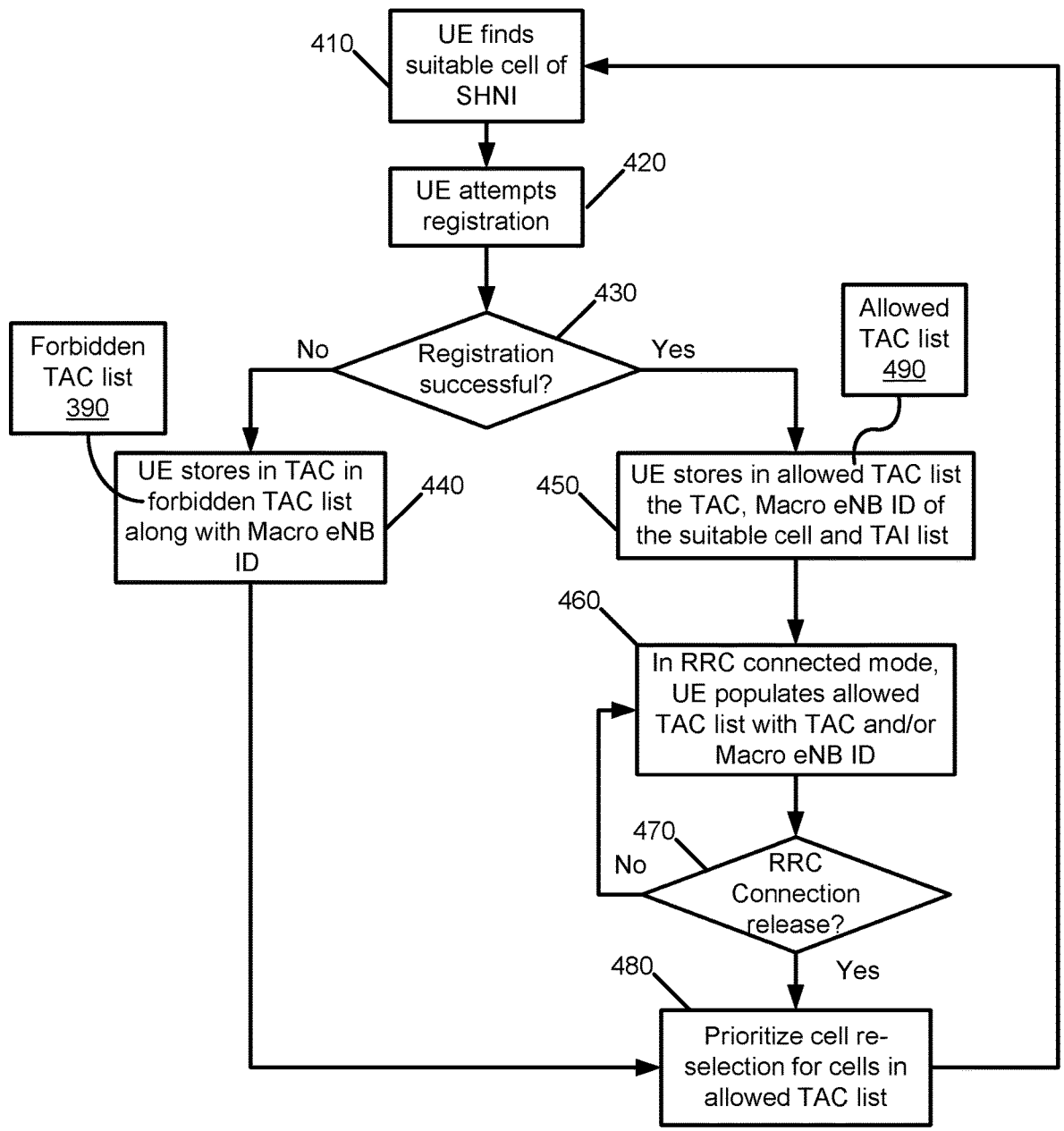
FIG. 4 is a logic flow diagram for a UE algorithm for SHNI allowed and forbidden list handling, in accordance with an exemplary embodiment.

This is explained in reference to FIG. 4, which is a logic flow diagram for a UE algorithm for SHNI allowed and forbidden list handling, in accordance with an exemplary embodiment. This figure also illustrates the operation of an exemplary method or methods, a result of execution of computer program instructions embodied on a computer readable memory, functions performed by logic implemented in hardware, and/or interconnected means for performing functions in accordance with exemplary embodiments. FIG. 4 is performed by a UE 110, e.g., under control of the control module 140, at least in part.

In block 410, the UE 110 finds a suitable cell of SHNI, and the UE 110 attempts registration in block 420. The UE 110 determines whether registration is successful in block 430. Note that, as illustrated in FIGS. 3 and 4, registration takes place after cell selection/re-selection (e.g., in blocks 310 and 410). If not (block 430=No), the UE stores the TAC (used for the attempted registration to the cell) in the forbidden TAC list 390, along with the Macro eNB ID. This occurs in block 440, and the flow proceeds to block 480.

By contrast, if the registration is successful (block 430=Yes), the flow proceeds to block 450. In this block, the UE 110 stores, in the allowed TAC list 490, the TAC of the cell on which the UE is camping, the Macro eNB ID of the suitable cell, in addition to the TAI list which may be provided by the network during the registration procedure. For the TAI list, this list can be provided by MME during the registration response and include additional TACs of its network. The UE 110 in block 460 and while in RRC connected mode, populates the allowed TAC list 490 with TACs and/or Macro eNB IDs of cells on which it successfully maintains an RRC connection. Block 460 is performed while there is no RRC connection release in block 470 (i.e., if block 470=No, the flow proceeds back to block 460).

In response to an RRC connection release in block 470 (block 470=Yes), the UE prioritizes cell re-selection for cells in the allowed TAC list 490. See block 480. This means the UE tries to use cells which are in the allowed list. If the cell is not in the allowed list, it could be because UE is not aware of it being part of the allowed list or because the cell is in the forbidden list. Cells in the forbidden list are not attempted. Cells for which UE does not know if they are allowed or forbidden are attempted after the prioritized, i.e., allowed list cells. Note that block 480 may also be entered from block 440. The flow proceeds to block 410 upon the selection of a suitable cell.

For more detail about FIG. 4 and the second embodiment, the UE 110 employing SHNI would maintain a list 490 of the allowed TACs for a given network identified by SHNI. This list 490 would comprise every TAC to which the UE successfully registered while camping on the SHNI and from the TAI list provided by the MME (e.g., as a network element 190) during an ATTACH ACCEPT procedure. See, e.g., block 450. Along with this list 490, the UE 110 would maintain (see blocks 460 and 470) a list of the Macro eNB IDs, where the UE has successfully registered or been in RRC connected mode, for every TAC.

The UE 110 would additionally maintain a list 390 of forbidden TACs encountered in SHNI networks. See block 440. In this list 390, the UE would store the forbidden TACs and the corresponding Macro eNB IDs of where the registration was rejected.

To enhance an idle-mode mobility procedure, the UE 110 could prioritize TACs and Macro eNB IDs within the allowed list 490. See block 480.

When the UE 110 is performing cell selection/re-selection (e.g., see blocks 410 and 420), the UE performs, in an exemplary embodiment, the following steps in addition to the steps outlined in 3GPP TS 23.122 and TS 36.104 for a UE in idle-mode network/cell selection procedures:

1) If the TAC and the Macro eNB ID (derived from ECGI) broadcast by the cell is in the forbidden TAC list 390, the cell is not considered as a suitable cell thus the UE 110 moves to limited service state and does not camp in the cell unless emergency services are needed.

2) If the TAC is in the forbidden TAC list 390, but the corresponding Macro eNB ID is not in the list, then this implies that the UE is allowed to camp in the TAC and the cell can be considered a suitable cell.

In a third embodiment, the pLTE network 50 could detect and mitigate TAC collisions or conflicts. This embodiment can be implemented together with the first embodiment or second embodiment or on its own.

Note that TACs do not need to be overlapping in coverage or even in each other's relative proximity, since as per 3GPP specifications, a TAC can remain in the UE forbidden TAC list 390 from 12 to 24 hours, which allows for plenty of travel/mobility time for the UE between the colliding TACs.

Figure 5:
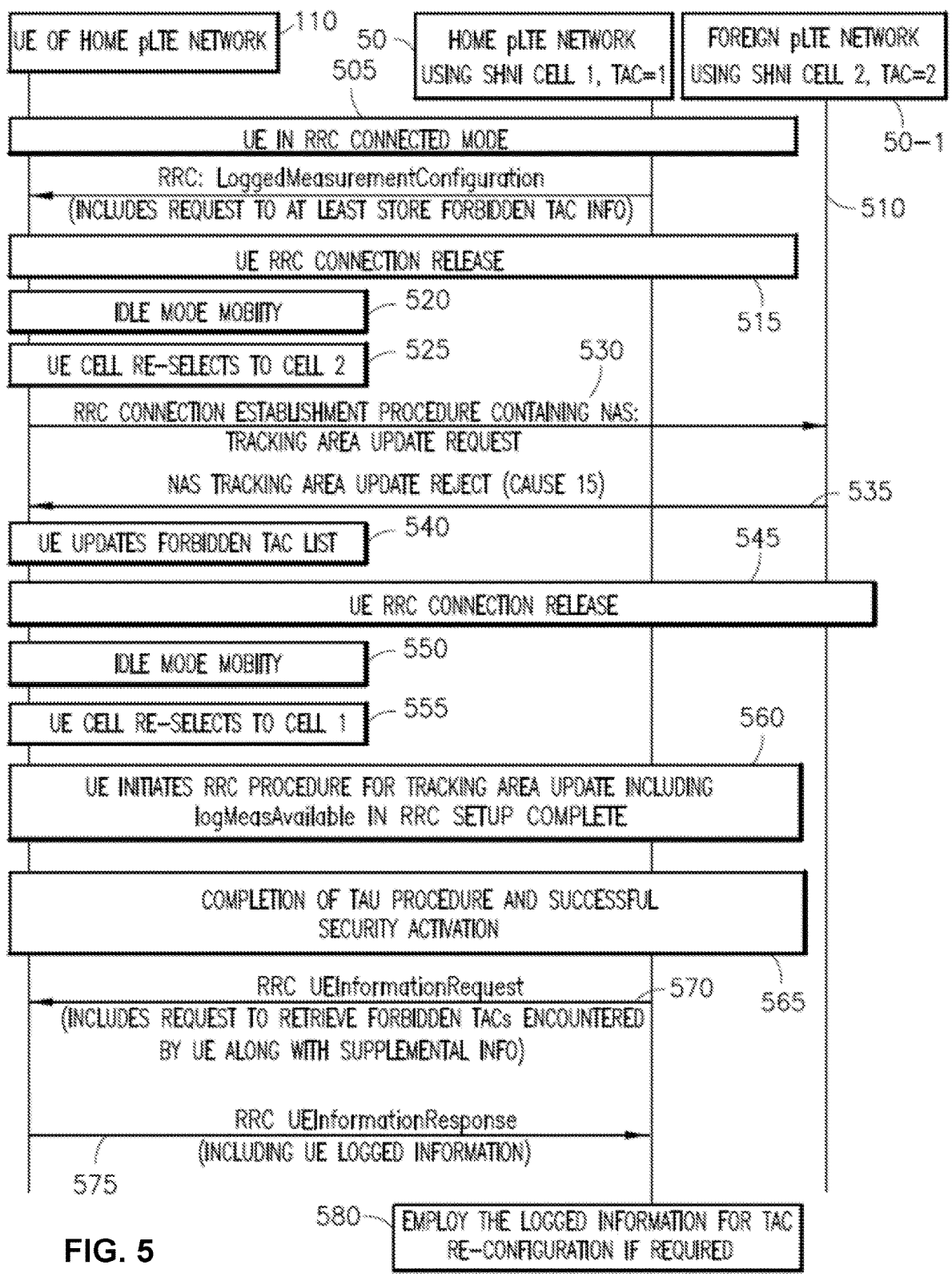
FIG. 5 is a call and logic flow diagram for an exemplary message sequence for TAC collision detection, in accordance with an exemplary embodiment.

This exemplary embodiment proposes that UEs are provided with the capability to store information at least on the location, and cell information of where the rejection took place. This, along with the TAC, is to be included in the forbidden TAC list 390, which could help TAC collision resolution in the UEs home pLTE. An exemplary call flow is provided in FIG. 5. FIG. 5 is a call and logic flow diagram for an exemplary message sequence for TAC collision detection, in accordance with an exemplary embodiment. This figure also illustrates the operation of an exemplary method or methods, a result of execution of computer program instructions embodied on a computer readable memory, functions performed by logic implemented in hardware, and/or interconnected means for performing functions in accordance with exemplary embodiments. FIG. 5 is performed by a UE 110, e.g., under control of the control module 140, at least in part, and a home pLTE network 50 or foreign pLTE network 50-1, under control of a corresponding control module 150, at least in part.

The UE in signaling 505 is in RRC mode with the home pLTE network 50, which uses SHNI cell 1 and TAC=1. The UE 110 is considered to have a subscription with pLTE network 50, i.e., its home pLTE network. In signaling 510, the home pLTE network 50 sends an RRC message of LoggedMeasurementConfiguration, which includes a request to at least store forbidden TAC information (info). In signaling 515, there is a UE RRC connection release. The UE in block 520 enters idle-mode mobility, and the UE 110 reselects to cell 2 in block 525.

The UE 110 then performs (see signaling 530) an RRC connection establishment procedure with the foreign pLTE network 50-1, which uses SHNI cell 2 and TAC=2. This procedure contains a NAS tracking area update request message. The foreign pLTE network 50-1 responds with a NAS tracking area update rejection (with cause code #15) in signaling 535.

In response, the UE updates its forbidden TAC list 390 in block 540. There is a UE RRC connection release in signaling 545. The UE enters a second idle-mode mobility in block 550, and the UE re-selects to cell 1 in block 555. The UE initiates an RRC procedure for a tracking area update, including logMeasAvailable IE in the RRC Connection Setup Complete message. See signaling 560. In signaling 565, there is completion of the Tracking Area Update (TAU)procedure, and successful security activation. The home pLTE network 50 transmits, in signaling 570, an RRC UEInformationRequest message, including a request to retrieve forbidden TACs encountered by the UE along with supplemental information (see below for examples). In signaling 575, the UE responds with a UEInformationResponse message, including UE logged information. Logged information includes, e.g., the rejected TACs and supplemental information as described.

In further detail for this third embodiment, upon successful RRC connection and registration with its home pLTE network, the UE could inform its serving cell about the availability of logged information related to forbidden TACs. See, e.g., signaling 575. The UE's home pLTE network 50 could configure (see, e.g., signaling 510) the UE to log information on the cells where registration rejection is received. Via, e.g., the VarLogMeasReport of LoggedMeasurementConfiguration IE (see 3GPP TS 36.111), the serving cell could limit the measurements to a certain area defined via AreaConfiguration (list of Cell IDs and TAC List), i.e., limit the logging to specific TACs deployed by the home network 50.

The UE's home pLTE network 50 can configure UEs to store supplemental information on forbidden TACs associated with the SHNI. See signaling 510. The stored supplemental information shall include at least the forbidden TAC and may additionally include one or more of the following.

1) A time the TAC was entered in the forbidden list.

2) ECGI of the cell where the registration procedure was rejected. Note that CBRSA manages the ECGI per operator employing the SNHI. Each operator is allocated a pool; hence it would be suitable to enable operator coordination to resolve TAC conflicts having ECGI information.

3) Location information of where the TAC was entered in the forbidden list.

4) Neighbor ECGI, which can be used to evaluate if the TAC collision is in overlapping coverage areas.

If the UE 110 includes a TAC in the forbidden list 390 for a SHNI which is the same as its home network SHNI, the UE 110 could inform the network of the availability of this information via, e.g., logMeasAvailable in the RRC Connection Setup Complete message. See signaling 560. Upon successful security procedure completion, the serving cell could retrieve the UE's logged information via the UEInformationRequest/Response procedures. See signaling 570/575. The UE's home pLTE network 50 can employ the information for TAC re-configuration if required. See block 580. That is, the home pLTE network 50 could re-configure the TACs being used, e.g., by changing these to other values.

Figure 6:
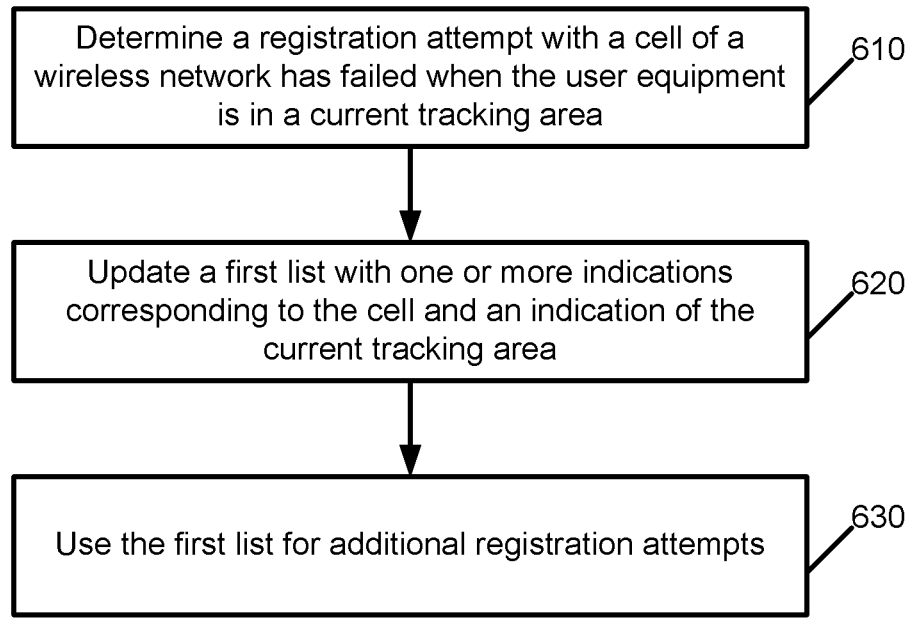
FIG. 6 is a logic flow diagram performed by a UE for private network tracking area collision avoidance.

Turning to FIG. 6, this figure is a logic flow diagram performed by a UE for private network tracking area collision avoidance. This figure illustrates the operation of an exemplary method or methods, a result of execution of computer program instructions embodied on a computer readable memory, functions performed by logic implemented in hardware, and/or interconnected means for performing functions in accordance with exemplary embodiments. The logic flow in FIG. 6 is performed by a UE 110, e.g., under control of the control module 140 at least in part.

In block 610, the UE 110 determines a registration attempt with a cell of a wireless network has failed when the user equipment is in a current tracking area. The UE 110, in block 620, updates a first list with one or more indications corresponding to the cell and an indication of the current tracking area. The UE 110, in block 630, uses the first list for additional attempts.

In the following examples, the method in FIG. 6 is referred to as example 1.

Example 2. The method of example 1, wherein the registration attempt or additional registration attempts comprise attach attempts or tracking area update attempts.

Example 3. The method of either example 1 or 2, wherein using by the user equipment the first list further comprises using by the user equipment the first list for cell selection or cell re-selection, and wherein a registration attempt is performed after a cell selection or cell re-selection.

Example 4. The method of any one of examples 1 to 3, wherein, for the using the first list, the user equipment evaluates whether a combination of a tracking area code corresponding to the current tracking area and a network name, which corresponds to the cell, is or is not part of the first list while performing cell selection, cell re-selection, or the additional registration attempts.

Example 5. The method of example 4, wherein the using by the user equipment the first list for the additional registration attempts further comprises performing a cell selection, a cell re-selection, or an additional registration in response to the combination of the tracking area code corresponding to the current tracking area and the network name not being in the first list.

Example 6. The method of example 4, wherein the user equipment performs, in addition to the evaluating whether the combination of the tracking area code corresponding to the current tracking area and the network name is or is not part of the first list:
determining whether the network name matches a network name for which the user equipment is provisioned while performing the cell selection, the cell re-selection, or the additional registration attempt.

Example 7. The method of example 6, wherein the using by the user equipment the first list for the additional registration attempts further comprises performing the cell selection, the cell re-selection, or the additional registration in response to the combination of the tracking area code corresponding to the current tracking area and the network name not being in the first list and the network name matching the network name for which the user equipment is provisioned.

Example 8. The method of any one of examples 4 to 7, wherein the network name is a citizen broadband radio service network name.

Example 9. The method of any one of examples 4 to 8, wherein determining the registration attempt by the user equipment with the cell of wireless network has failed comprises determining the registration attempt was rejected with a certain cause code indicating a registration procedure for the registration attempt was unsuccessful.

Example 10. The method of example 9, wherein the cause code is cause code number 15, indicating a non-access stratum tracking area update rejection or an attach rejection and indicating the user equipment is forbidden from further registration attempts in the tracking area corresponding to the tracking area code for a period of time.

Example 11. The method of any one of examples 4 to 10, wherein the one or more indications corresponding to the cell comprise a network name corresponding to the cell in response to the cell being a home cell for the user equipment.

Example 12. The method of example 1, wherein:
the one or more indications in the first list are one or more first indications;
the method further comprises:
in response to an additional registration attempt by the user equipment to another cell being successful, adding by the user equipment one or more second indications corresponding to the other cell and an indication of the current tracking area for the other cell to a second list; and
prioritizing by the user equipment cell re-selection using cells in the second list.

Example 13. The method of example 12, wherein the one or more second indications comprise an identification of a base station corresponding to the cell.

Example 14. The method of example 13, wherein using by the user equipment the first list for additional registration attempts comprises, in response to the indication of the current tracking area being in the first list and the identification of the base station being in the first list, not considering the cell as a suitable cell for another attempt for cell selection, cell re-selection, or the additional registration attempts.

Example 15. The method of example 13, wherein using by the user equipment the first list for the additional registration attempts comprises, in response to the indication of the current tracking area being in the second list and the identification of the base station being in the second list, considering the cell as a suitable cell for another attempt for cell selection, cell re-selection, or the additional registration attempts.

Example 16. The method of any one of examples 1 to 15, further comprising storing supplemental information along with the one or more indications corresponding to the cell and an indication of the current tracking area in the first list.

Example 17. The method of example 16, wherein the supplemental information comprises at least one of the following: a location at which the failure took place; a time correspond to when the failure took place; or one or more cell identifiers corresponding to where the failure occurred.

Example 18. The method of any one of examples 16 or 17, further comprising:
receiving by the user equipment from a certain cell a request to store information for the first list;
performing by the user equipment the storing the supplemental information in response to receiving the request; and
sending by the user equipment the supplemental information to the certain cell.

Example 19. The method of example 18, wherein the sending the supplemental information to the certain cell is performed after successful security procedure activation with the certain cell and in response to a request for the supplemental information from the certain cell.

Figure 7:
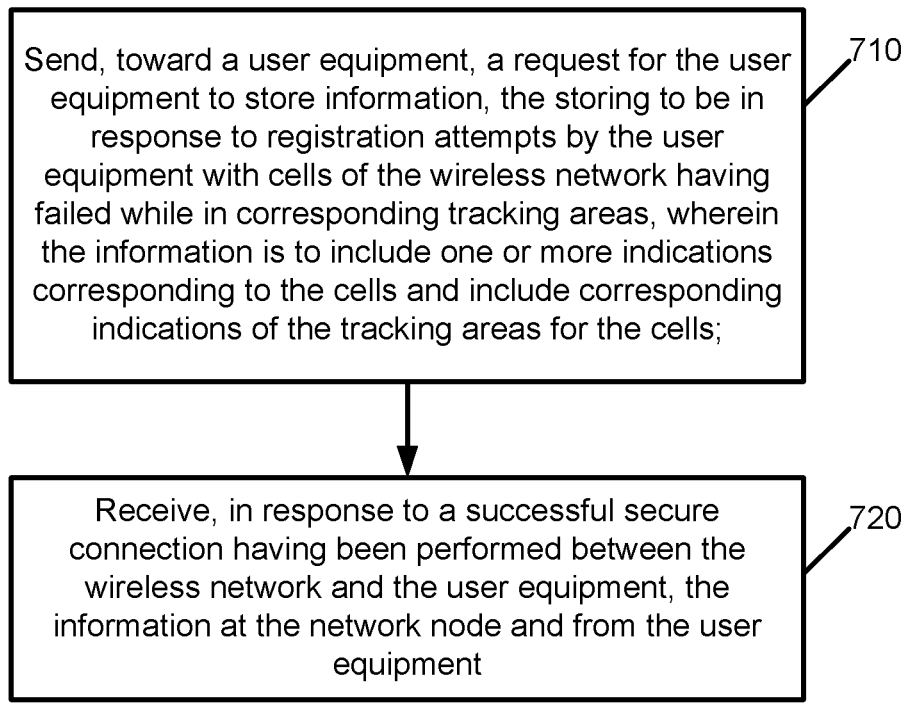
FIG. 7 is a logic flow diagram performed by a network node for private network tracking area collision avoidance.

Referring to FIG. 7, this figure is a logic flow diagram performed by a network node for private network tracking area collision avoidance. This figure illustrates the operation of an exemplary method or methods, a result of execution of computer program instructions embodied on a computer readable memory, functions performed by logic implemented in hardware, and/or interconnected means for performing functions in accordance with exemplary embodiments. The logic flow in FIG. 7 is assumed to be performed by a network node such as an eNB 170 (or other RAN node), e.g., under control of the control module 150 at least in part. It is noted, however, that this might be performed by another network node, such as an MME (e.g., as a network element 190), in conjunction with or separate from the eNB 170 (or other RAN node).

In block 710, the network node sends, toward a user equipment, a request for the user equipment to store information. The storing is to be performed in response to registration attempts by the user equipment with cells of the wireless network having failed while in corresponding tracking areas. The information is to include one or more indications corresponding to the cells and include corresponding indications of the tracking areas for the cells. In block 720, in response to a successful secure connection having been performed between the wireless network and the user equipment, the information is received at the network node and from the user equipment.

In the following examples, the method of FIG. 7 is referred to as example 20.

Example 21. The method of example 20, wherein the sending the request for the user equipment to store information further comprises sending the request in conjunction with a radio resource control message configuring the information the user equipment should log, the logged information to comprise the one or more indications corresponding to the cells and the corresponding indications of the tracking areas for the cells.

Example 22. The method of any one of example 21, wherein:
  the method further comprises requesting by the network node for the information to be logged prior to receiving the information; and
  the receiving the logged information is performed responsive to the request by the network node for the information.

Example 23. The method of example 22, wherein the requesting by the network node for the information prior to receiving the information uses a radio resource control message comprising an information request for the logged information and the receiving the information receives a radio resource control message comprising an information response comprising the logged information from the user equipment.

Example 24. The method of any one of examples 20 to 23, wherein the network node comprises a base station of the wireless network.

Example 25. The method of any one of examples 20 to 24, further comprising employing the information from the user equipment for re-configuration of tracking area codes for corresponding cells in the wireless network.

Example 26. The method of example 25, wherein the employing the information from the user equipment for re-configuration of tracking area codes for corresponding cells in the wireless network is performed by the network node.

Example 27. A computer program, comprising code for performing the methods of any one of examples 1 to 26, when the computer program is run on a computer.

Example 28. The computer program according to example 27, wherein the computer program is a computer program product comprising a computer-readable medium bearing computer program code embodied therein for use with the computer.

Example 29. The computer program according to example 27, wherein the computer program is directly loadable into an internal memory of the computer.

Example 30. An apparatus comprising means for performing:
  determining a registration attempt by a user equipment with a cell of a wireless network has failed when the user equipment is in a current tracking area;
  updating by the user equipment a first list with one or more indications corresponding to the cell and an indication of the current tracking area; and
  using by the user equipment the first list for additional registration attempts.

Example 31. The apparatus of example 30, wherein the registration attempt or additional registration attempts comprise attach attempts or tracking area update attempts.

Example 32. The apparatus of either example 30 or 31, wherein using by the user equipment the first list further comprises using by the user equipment the first list for cell selection or cell re-selection, and wherein a registration attempt is performed after a cell selection or cell re-selection.

Example 33. The apparatus of any one of examples 30 to 32, wherein, for the using the first list, the user equipment evaluates whether a combination of a tracking area code corresponding to the current tracking area and a network name, which corresponds to the cell, is or is not part of the first list while performing cell selection, cell re-selection, or the additional registration attempts.

Example 34. The apparatus of example 33, wherein the using by the user equipment the first list for the additional registration attempts further comprises performing a cell selection, a cell re-selection, or an additional registration in response to the combination of the tracking area code corresponding to the current tracking area and the network name not being in the first list.

Example 35. The apparatus of example 33, wherein the user equipment performs, in addition to the evaluating whether the combination of the tracking area code corresponding to the current tracking area and the network name is or is not part of the first list:
  determining whether the network name matches a network name for which the user equipment is provisioned while performing the cell selection, the cell re-selection, or the additional registration attempt.

Example 36. The apparatus of example 35, wherein the using by the user equipment the first list for the additional registration attempts further comprises performing the cell selection, the cell re-selection, or the additional registration in response to the combination of the tracking area code corresponding to the current tracking area and the network name not being in the first list and the network name matching the network name for which the user equipment is provisioned.

Example 37. The apparatus of any one of examples 33 to 36, wherein the network name is a citizen broadband radio service network name.

Example 38. The apparatus of any one of examples 33 to 37, wherein determining the registration attempt by the user equipment with the cell of wireless network has failed comprises determining the registration attempt was rejected with a certain cause code indicating a registration procedure for the registration attempt was unsuccessful.

Example 39. The apparatus of example 38, wherein the cause code is cause code number 15, indicating a non-access stratum tracking area update rejection or an attach rejection and indicating the user equipment is forbidden from further registration attempts in the tracking area corresponding to the tracking area code for a period of time.

Example 40. The apparatus of any one of examples 33 to 39, wherein the one or more indications corresponding to the cell comprise a network name corresponding to the cell in response to the cell being a home cell for the user equipment.

Example 41. The apparatus of example 30, wherein:
the one or more indications in the first list are one or more first indications;
the means are further configured to perform:
in response to an additional registration attempt by the user equipment to another cell being successful, adding by the user equipment one or more second indications corresponding to the other cell and an indication of the current tracking area for the other cell to a second list; and
prioritizing by the user equipment cell re-selection using cells in the second list.

Example 42. The apparatus of example 42, wherein the one or more second indications comprise an identification of a base station corresponding to the cell.

Example 43. The apparatus of example 42, wherein using by the user equipment the first list for additional registration attempts comprises, in response to the indication of the current tracking area being in the first list and the identification of the base station being in the first list, not considering the cell as a suitable cell for another attempt for cell selection, cell re-selection, or the additional registration attempts.

Example 44. The apparatus of example 43, wherein using by the user equipment the first list for the additional registration attempts comprises, in response to the indication of the current tracking area being in the second list and the identification of the base station being in the second list, considering the cell as a suitable cell for another attempt for cell selection, cell re-selection, or the additional registration attempts.

Example 45. The apparatus of any one of examples 30 to 44, wherein the means are further configured to perform: storing supplemental information along with the one or more indications corresponding to the cell and an indication of the current tracking area in the first list.

Example 46. The apparatus of example 45, wherein the supplemental information comprises at least one of the following: a location at which the failure took place; a time correspond to when the failure took place; or one or more cell identifiers corresponding to where the failure occurred.

Example 47. The apparatus of any one of examples 45 or 46, wherein the means are further configured to perform:
receiving by the user equipment from a certain cell a request to store information for the first list;
performing by the user equipment the storing the supplemental information in response to receiving the request; and
sending by the user equipment the supplemental information to the certain cell.

Example 48. The apparatus of example 47, wherein the sending the supplemental information to the certain cell is performed after successful security procedure activation with the certain cell and in response to a request for the supplemental information from the certain cell.

Example 49. An apparatus comprising means for performing:
sending, by a network node toward a user equipment, a request for the user equipment to store information, the storing to be in response to registration attempts by the user equipment with cells of the wireless network having failed while in corresponding tracking areas, wherein the information is to include one or more indications corresponding to the cells and include corresponding indications of the tracking areas for the cells; and
receiving, in response to a successful secure connection having been performed between the wireless network and the user equipment, the information at the network node and from the user equipment.

Example 50. The apparatus of example 49, wherein the sending the request for the user equipment to store information further comprises sending the request in conjunction with a radio resource control message configuring the information the user equipment should log, the logged information to comprise the one or more indications corresponding to the cells and the corresponding indications of the tracking areas for the cells.

Example 51. The apparatus of any one of example 50, wherein:
the means are further configured to perform requesting by the network node for the information to be logged prior to receiving the information; and
the receiving the logged information is performed responsive to the request by the network node for the information.

Example 52. The apparatus of example 51, wherein the requesting by the network node for the information prior to receiving the information uses a radio resource control message comprising an information request for the logged information and the receiving the information receives a radio resource control message comprising an information response comprising the logged information from the user equipment.

Example 53. The apparatus of any one of examples 49 to 52, wherein the network node comprises a base station of the wireless network.

Example 54. The apparatus of any one of examples 49 to 53, wherein the means are further configured to perform: employing the information from the user equipment for re-configuration of tracking area codes for corresponding cells in the wireless network.

Example 55. The apparatus of example 54, wherein the employing the information from the user equipment for re-configuration of tracking area codes for corresponding cells in the wireless network is performed by the network node.

Example 56. The apparatus of any of examples 30 to 55 wherein the means comprises:
at least one processor; and
at least one memory including computer program code, the at least one memory and computer program code configured to, with the at least one processor, cause the performance of the apparatus.

Example 57. An apparatus, comprising:
one or more processors; and
one or more memories including computer program code,
wherein the one or more memories and the computer program code are configured, with the one or more processors, to cause the apparatus to:
determine a registration attempt by a user equipment with a cell of a wireless network has failed when the user equipment is in a current tracking area;

update by the user equipment a first list with one or more indications corresponding to the cell and an indication of the current tracking area; and use by the user equipment the first list for additional registration attempts.

Example 58. An apparatus, comprising:

one or more processors; and one or more memories including computer program code, wherein the one or more memories and the computer program code are configured, with the one or more processors, to cause the apparatus to:

send, by a network node toward a user equipment, a request for the user equipment to store information, the storing to be in response to registration attempts by the user equipment with cells of the wireless network having failed while in corresponding tracking areas, wherein the information is to include one or more indications corresponding to the cells and include corresponding indications of the tracking areas for the cells; and receive, in response to a successful secure connection having been performed between the wireless network and the user equipment, the information at the network node and from the user equipment.

Example 59. A computer program product comprising a computer-readable storage medium bearing computer program code embodied therein for use with a computer, the computer program code comprising:

code for determining a registration attempt by a user equipment with a cell of a wireless network has failed when the user equipment is in a current tracking area;

code for updating by the user equipment a first list with one or more indications corresponding to the cell and an indication of the current tracking area; and code for using by the user equipment the first list for additional registration attempts.

Example 60. A computer program product comprising a computer-readable storage medium bearing computer program code embodied therein for use with a computer, the computer program code comprising:

code for sending, by a network node toward a user equipment, a request for the user equipment to store information, the storing to be in response to registration attempts by the user equipment with cells of the wireless network having failed while in corresponding tracking areas, wherein the information is to include one or more indications corresponding to the cells and include corresponding indications of the tracking areas for the cells; and code for receiving, in response to a successful secure connection having been performed between the wireless network and the user equipment, the information at the network node and from the user equipment.

Without in any way limiting the scope, interpretation, or application of the claims appearing below, a technical effect and advantage of one or more of the example embodiments disclosed herein is the exemplary embodiments provide efficient solutions to resolve outages which could stem from two pLTE networks employing the same TAC when using the same SHNI. Another technical effect and advantage of one or more of the example embodiments disclosed herein is the exemplary embodiments allow for efficient use of the SHNI and TAC without reducing the number of possible SHNI allocations to operators and without constraining the number of TACs per operator. That is, if 10,000 SHNI operators are possible currently with SHNI and there are 64,000 TACs available, one could have six unique TACs per operator.

As used in this application, the term "circuitry" may refer to one or more or all of the following:

(a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects are set out above, other aspects comprise other combinations of features from the described embodiments, and not solely the combinations described above.

It is also noted herein that while the above describes example embodiments of the invention, these descriptions should not be viewed in a limiting sense. Rather, there are several variations and modifications which may be made without departing from the scope of the present invention.

The following abbreviations that may be found in the specification and/or the drawing figures are defined as follows:

3GPP third generation partnership project
5G fifth generation
5GC 5G core network
AMF access and mobility management function
AS Access Stratum
CBRS citizen broadband radio service
CBRSA CBRS Alliance
CSG closed subscriber group
CU central unit
DU distributed unit
ECGI E-UTRAN Global Cell Identifier
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
E-UTRAN evolved universal terrestrial radio access network
gNB (or gNodeB) base station for 5G/NR, i.e., a node providing NR user plane and control plane protocol terminations towards the UE, and connected via the NG interface to the 5GC
Id or ID or id identifier (e.g., or identification)
IE information element
I/F interface
IMSI international mobile subscriber identity
LTE long term evolution
PLMN public land mobile network
pLTE private LTE
MAC medium access control
MDT minimization of drive tests
MNO mobile network operator
MME mobility management entity
MSO multiple system operator
NAS Non-Access Stratum
ng or NG next generation
ng-eNB or NG-eNB next generation eNB
NR new radio
N/W or NW network
PCI physical cell identifier
PDCP packet data convergence protocol
PHY physical layer
PLMN public land mobile network
RAN radio access network
Rel release
RLC radio link control
RRH remote radio head
RRC radio resource control
RU radio unit
Rx receiver
SDAP service data adaptation protocol
SHNI shared home network identifier
SGW serving gateway
SIB system information block
SMF session management function
TA tracking area
TAC tracking area code
TAI tracking area identity
TAU tracking area update
TR technical report
TS technical specification
Tx transmitter
UE user equipment (e.g., a wireless, typically mobile device)
UPF user plane function
USIM Universal Subscriber Identity Module

What is claimed is:

1. A method, comprising:
determining a registration attempt by a user equipment with a cell of a wireless network has failed when the user equipment is in a current tracking area;
updating by the user equipment a first list with one or more indications corresponding to the cell and an indication of the current tracking area;
using by the user equipment the first list for additional registration attempts;
evaluating by the user equipment whether a combination of a tracking area code corresponding to the current tracking area and a network name corresponding to the cell, is or is not part of the first list while performing cell selection, cell re-selection, or the additional registration attempts; and
determining whether the network name matches a network name for which the user equipment is provisioned while performing the cell selection, the cell re-selection, or the additional registration attempts.

2. An apparatus comprising:
one or more processors; and
one or more memories including computer program code, wherein the one or more memories and the computer program code are configured, with the one or more processors, to cause the apparatus to:
determine a registration attempt by a user equipment with a cell of a wireless network has failed when the user equipment is in a current tracking area;
update by the user equipment a first list with one or more indications corresponding to the cell and an indication of the current tracking area;
use by the user equipment the first list for additional registration attempts,
evaluate by the user equipment whether a combination of a tracking area code corresponding to the current tracking area and a network name corresponding to the cell, is or is not part of the first list while performing cell selection, cell re-selection, or the additional registration attempts; and
determine whether the network name matches a network name for which the user equipment is provisioned while performing the cell selection, the cell re-selection, or the additional registration attempts,
wherein the apparatus forms at least part of the user equipment.

3. The apparatus of claim 2, wherein the registration attempt or additional registration attempts comprise attach attempts or tracking area update attempts.

4. The apparatus of claim 2, wherein using by the user equipment the first list further comprises using by the user equipment the first list for cell selection or cell re-selection, and wherein a registration attempt is performed after a cell selection or cell re-selection.

5. The apparatus of claim 2, wherein the using by the user equipment the first list for the additional registration attempts further comprises performing a cell selection, a cell re-selection, or an additional registration in response to the combination of the tracking area code corresponding to the current tracking area and the network name not being in the first list.

6. The apparatus of claim 2, wherein the using by the user equipment the first list for the additional registration attempts further comprises performing the cell selection, the cell re-selection, or an additional registration in response to the combination of the tracking area code corresponding to the current tracking area and the network name not being in the first list and the network name matching the network name for which the user equipment is provisioned.

7. The apparatus of claim 2, wherein determining the registration attempt by the user equipment with the cell of wireless network has failed comprises determining the registration attempt was rejected with a certain cause code indicating a registration procedure for the registration attempt was unsuccessful.

8. The apparatus of claim 2, wherein:
the one or more indications in the first list are one or more first indications;
the one or more memories and the computer program code are further configured, with the one or more processors, to cause the apparatus to:
in response to an additional registration attempt by the user equipment to another cell being successful, add by the user equipment one or more second indications corresponding to the other cell and an indication of the current tracking area for the other cell to a second list; and
prioritize by the user equipment cell re-selection using cells in the second list.

9. The apparatus of claim 8, wherein the one or more second indications comprise an identification of a base station corresponding to the cell.

10. The apparatus of claim 2, wherein the one or more memories and the computer program code are further configured, with the one or more processors, to cause the apparatus to:
store supplemental information along with the one or more indications corresponding to the cell and an indication of the current tracking area in the first list.

11. The apparatus of claim 10, wherein the one or more memories and the computer program code are further configured, with the one or more processors, to cause the apparatus to:
receive by the user equipment from a certain cell a request to store information for the first list;
perform by the user equipment the storing of the supplemental information in response to receiving the request; and
send by the user equipment the supplemental information to the certain cell.

\* \* \* \* \*